(12) United States Patent
Madden

(10) Patent No.: US 9,816,844 B2
(45) Date of Patent: Nov. 14, 2017

(54) SMARTPHONE OPERATED AIR PRESSURE METER AND SYSTEM

(71) Applicant: Scott Madden, Hollywood, FL (US)

(72) Inventor: Scott Madden, Hollywood, FL (US)

(73) Assignee: CPS Products, Inc., Hialeah, FL (US)

( * ) Notice: Subject to any disclaimer, the term of this patent is extended or adjusted under 35 U.S.C. 154(b) by 398 days.

(21) Appl. No.: 14/680,670

(22) Filed: Apr. 7, 2015

(65) Prior Publication Data

US 2016/0109318 A1 Apr. 21, 2016

Related U.S. Application Data

(60) Provisional application No. 62/064,033, filed on Oct. 15, 2014.

(51) Int. Cl.
G01L 7/00 (2006.01)
G01F 1/00 (2006.01)
G01L 19/08 (2006.01)
G01F 1/34 (2006.01)

(52) U.S. Cl.
CPC .................. G01F 1/00 (2013.01); G01F 1/34 (2013.01); G01L 7/00 (2013.01); G01L 19/08 (2013.01); G01L 19/083 (2013.01)

(58) Field of Classification Search
None
See application file for complete search history.

(56) References Cited

U.S. PATENT DOCUMENTS

| | | | | |
|---|---|---|---|---|
| 2011/0079427 A1* | 4/2011 | Powale | ................. | H01B 3/427 174/72 A |
| 2014/0059465 A1* | 2/2014 | Mairs | ................. | G06F 3/04842 715/771 |
| 2015/0058779 A1* | 2/2015 | Bruck | ................. | F24F 11/0086 715/771 |
| 2015/0133043 A1* | 5/2015 | Patel | ................. | F24F 11/0001 454/258 |
| 2015/0179054 A1* | 6/2015 | Castillo | ................. | G08C 17/02 340/12.5 |
| 2016/0097555 A1* | 4/2016 | Lyons | ................. | F24F 11/001 702/45 |

* cited by examiner

Primary Examiner — Andre Allen
(74) Attorney, Agent, or Firm — Jason T. Daniel, Esq.; Daniel Law Offices, P.A.

(57) ABSTRACT

A smartphone-operated air pressure meter and system includes an air pressure meter having a pair of input channels that are each connected to a pressure chamber and pressure sensor. A control unit is included with the pressure meter for receiving air pressure data and for transmitting the same. The system also includes an airflow balancing application that generates one or more application icons, and calculates airflow information. The airflow information can include the received pressure data alone, or pressure data that has been applied to a mathematical algorithm, along with environmental data.

20 Claims, 10 Drawing Sheets

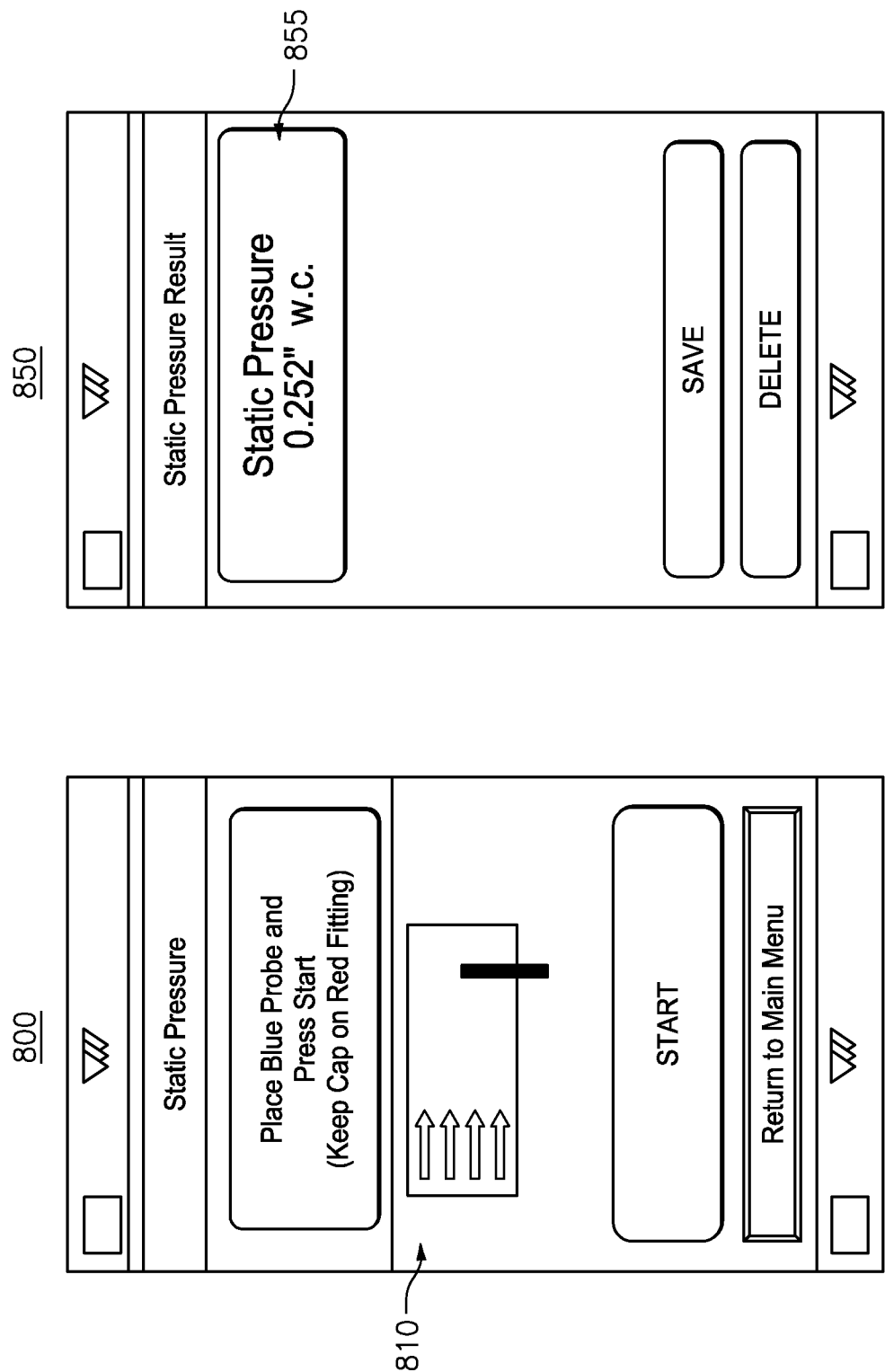

SMARTPHONE OPERATED AIR PRESSURE METER AND SYSTEM

CROSS-REFERENCE TO RELATED APPLICATIONS

This application claims the benefit of U.S. Application Ser. No. 62/064,033 filed on Oct. 15, 2014, the contents of which are incorporated herein by reference.

TECHNICAL FIELD

The present invention relates generally to air pressure measurement devices, and more particularly to an air pressure measurement device and system which can utilize the processing and communicative abilities of a smartphone to obtain and distribute accurate pressure readings.

BACKGROUND

The statements in this section merely provide background information related to the present disclosure and may not constitute prior art.

Air pressure determines the air quality in a building. In HVAC systems, the static air pressure is often referred to as the system blood pressure. If the static pressure is not managed properly the systems cannot function properly. Excessive static drop in heating and cooling systems kills the system efficiency, reduces airflow greatly, causes discomfort, causes excessive noise, causes air quality issues, damages equipment, and shortens the lifespan.

Getting accurate air pressure readings enables technicians the ability to correct all of these issues. As such, in the HVAC industry, there are several techniques that are used to determine the air velocity. In this field, air velocity (distance traveled per unit of time) is usually expressed in linear feet per minute (LFM) or meters per second (m/s). By multiplying air velocity by the cross section area of an air duct, you can determine the air volume flowing past a point in the duct per unit of time. Volume flow is measured in cubic feet per minute (CFM) or cubic meters per hour (M3/h).

Velocity or volume measurements can often be used with engineering handbooks or design information to reveal proper or improper performance of an airflow system. The same principles used to determine velocity are also valuable in working with pneumatic conveyance. To move air, fans or blowers are usually used. They work by imparting motion and pressure to the air with either a screw propeller, impeller, cage, or paddle wheel action. When force or pressure from the fan blades causes the air to move, the moving air acquires a force or pressure component in its direction of motion due to its weight and inertia. Because of this, a flag or streamer will stand out in the air stream. This force is called velocity pressure.

Velocity pressure is typically measured in inches of water column (w.c.) or water gauge (w.g.). In HVAC duct systems, a second pressure is always present. It is independent of air velocity or movement. Known as static pressure, it applies pressure equally in all directions. In air conditioning work, this pressure is also measured in inches of water column. In pressure or supply systems, static pressure will be positive on the discharge side of the fan. In exhaust systems, a negative static pressure will exit on the inlet side of the fan. When a fan is installed midway between the inlet and discharge of a duct system, it is normal to have a negative static pressure at the fan inlet and positive static pressure at its discharge.

Total pressure is the combination of static and velocity pressures, and is utilized to determine the health of an HVAC system and/or to make adjustments to the same in order to increase efficiency.

There are many known commercially available manometer devices which can function to assist HVAC technicians and/or engineers to gather and calculate various elements of the total pressure within HVAC systems. To this end, each of these devices are specialty-built standalone equipment having dedicated components such as a dedicated processor and memory, display screen, user keyboard and sensors. As such, these devices are expensive to manufacture and are typically limited to performing certain types of building measurements.

In addition to the above, it is sometimes necessary to factor environmental conditions such as atmospheric pressure, humidity levels and/or barometric pressures into the pressure readings obtained within an HVAC system, in order to obtain a true and accurate system reading. At the present time, any adjustments based on environmental conditions must be performed manually owing to the limited capacity of existing systems.

Accordingly, it would be beneficial to provide an air pressure device and system which can utilize the processing and communicative abilities of a smartphone to obtain and distribute accurate pressure readings that does not suffer from the drawbacks of the above noted devices.

SUMMARY OF THE INVENTION

The present invention is directed to an air pressure meter and system. One embodiment of the present invention can include an air pressure meter having a pair of input channels that are each connected to a pressure chamber and pressure sensor. A control unit is included with the pressure meter and functions to receive air pressure data from the pressure sensors and to transmit the same.

The system also includes an airflow balancing application which can be downloaded onto a processor enabled device such as a smartphone, tablet or PC. The application can generate one or more icons for accessing the application functionality, and can calculate and display airflow information on the processor enabled device. In this regard, the information can include the exact air pressure data captured by the air pressure meter, or additional information that has been calculated utilizing the air pressure data and one or more mathematical algorithms.

Another embodiment of the present invention can include the ability for the airflow balancing application to also access device location and environmental data, and can factor these into the calculated airflow information. As such, the airflow information can include, but is not limited to Total Pressure, Static Pressure, Pressure Velocity, Velocity, Absolute Pressure, Atmospheric Pressure, Temperature, Humidity, Dew Point, and/or Air/Gas Volume.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIGS. 6A-10 illustrate various exemplary display screens in accordance with one embodiment of the invention.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
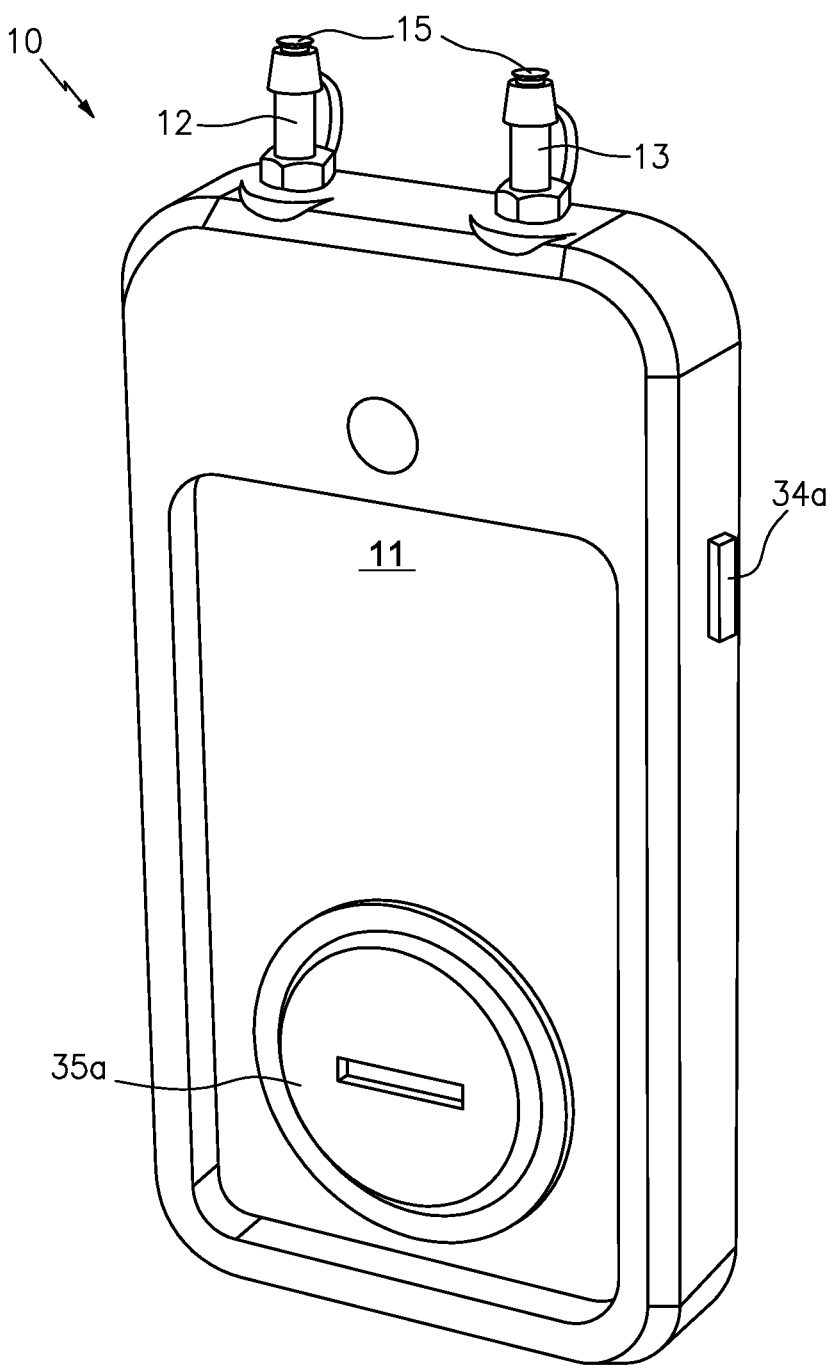
FIG. 1 illustrates one embodiment of the air pressure meter of the smartphone-operated air pressure system that is useful for understanding the inventive concepts disclosed herein.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

A smartphone-operated air pressure meter and system 100 can function to allow a user to quickly and easily capture air pressure readings within a building or other desirable location utilizing an air pressure meter 10 that is communicatively linked with a smartphone or other such device running an airflow balancing application 50. As such, the system 100 can utilize the processing power, storage, communication and/or GPS location tracking abilities of the smartphone to accurately measure and/or calculate airflow information. In this regard, the system can utilize the smartphone to apply complex calculations and algorithms, import and reference data-feeds from weather and other types of online data services, provide onscreen user guidance, data logging, history log transmittal, provide remote service support and/or remote calibration, provide OTA software updates and the like.

As described throughout this document, the term "airflow information" can include any form of information that can be captured by, or calculated from data that is supplied in whole, or in part, by the below described airflow meter. Several nonlimiting examples include: Total Pressure, Static Pressure, Pressure Velocity, Velocity, Absolute Pressure, Atmospheric Pressure, Temperature, Humidity, Dew Point, and/or Air/Gas Volume, for example.

In the below described examples, programming code for implementing the air pressure meter system can be presented in the form of a smartphone mobile application (i.e., App) which can be preloaded on the smartphone device, or installed or downloaded as an application after purchase of the smartphone device. Of course, the inventive concepts disclosed herein are not to be construed as limiting to a smartphone App, as virtually any type of instruction sets, in any form of programming language that can be executed on a processor enabled device are also contemplated.

Smartphones and mobile tablets contemplated herein comprise any of commonly available Smartphones including but not limited to those sold under the trade names iPhone, iPad, HTC Inspire, Freestyle, HD7S, Surround, LG Quantum, Encore, Phoenix, BlackBerry Bold, Torch, Pearl 3G, Curve, Samsung Solstice, Focus, Captivate, Infuse, MOTOROLA ATRIX, FLIPSIDE, Google tablet, and HP Veer 4G, for example.

Although described and illustrated as being utilized by a smartphone, this is for illustrative purposes only, as virtually any device capable of providing two way communication with a secondary device and/or a human operator can be utilized herein. Several nonlimiting examples also include various forms of tablet computers, personal computers, PDA's, desktop computers and other forms of processor enabled devices and systems, for example. Accordingly, the device and/or method steps are not to be construed as limiting in any manner.

A user's smartphone or tablet device generally includes installed software adapted to generate an airflow balancing icon that is included with the airflow balancing application, and to display same on the display screen of the smartphone device. An actuating means is provided for actuating the airflow balancing icon through use of a touch sensitive smartphone or tablet screen. Touching the airflow balancing icon launches the system application and/or launches a linked web page through internet connectivity. Location information such as GPS enabled software is provided in association with the Smartphone or tablet. This location information can be shared with the airflow balancing application to aid in determining various environmental data. Software for displaying the airflow balancing icon and importing environmental data based on the device location (as provided by the GPS enabled software) is also provided.

As described herein, the term "environmental data" can include any type of weather information at a particular location, such as atmospheric pressure, humidity levels and/or barometric pressures, for example, which can be retrieved from any available source, such as a third party website providing such information, for example. This information can be retrieved/imported to the smartphone as any type of data field such as XML or RSS, for example, and can be utilized by the airflow balancing application system in determining the airflow information.

FIGS. 1-4 illustrate one embodiment of a smartphone-operated air pressure meter 10 that is useful for understanding the inventive concepts disclosed herein. As shown, the device 10 can include, essentially, a main body 11, input channels 12 and 13, first and second pressure chambers 22 and 23, internal pressure sensors 24 and 25, and a control unit 30.

The main body 11 can function to house each of the device elements in a conventional manner, so as to create a single, lightweight portable device. In this regard, the main body 11 can take any number of different shapes and sizes, and can be constructed from any number of different materials utilizing known construction methodologies. In one preferred embodiment, the main body 11 can include a generally hollow rectangular shape that is constructed from lightweight injection molded plastic having a plurality of internal connectors (not shown) for securely housing each of the device elements. Of course, any number of other known construction materials such as PVC and/or composites, for example, are also contemplated.

Input channels 12 and 13 can function to receive air from any number of secondary devices such as a static pressure sensor and/or a total pressure sensor, for example, each having air supply tubes secured thereto. In this regard, each of the input channels can include elongated, generally tubular members having an opening 12a and 13a, respectively along the distal ends. In the preferred embodiment, each of the input channels 12 and 13 can be constructed from brass tubes having a connector 14, such as a plurality of barbs, for example, secured thereon, in order to engage and retain the air supply tubes of the external sensors. In one embodiment, each of the input channels 12 and 13 can include a shape and size that is suitable for mating with conventional air supply tubes having an inside dimension of between 1/8 inches and 3/16 inches, for example. Of course, the input channels 12 and 13 are not limited to the above described configuration, as one or more of the channels can be constructed to include any number of different shapes, dimensions and/or construction materials.

In another embodiment, the device 10 can further include a pair of channel covers 15, which can be removably secured across the openings of the input channels 12 and/or 13, in order to create an airtight seal. The covers 15 can function to protect each of the channels when the device is not in use, and can also function to seal individual channels, in order to form an airtight space so as to allow the device to operate using only one of the channels 12 or 13 at a time. To this end, each of the covers 15 can be constructed from any number of suitable materials such as plastic, for example.

Figure 2:
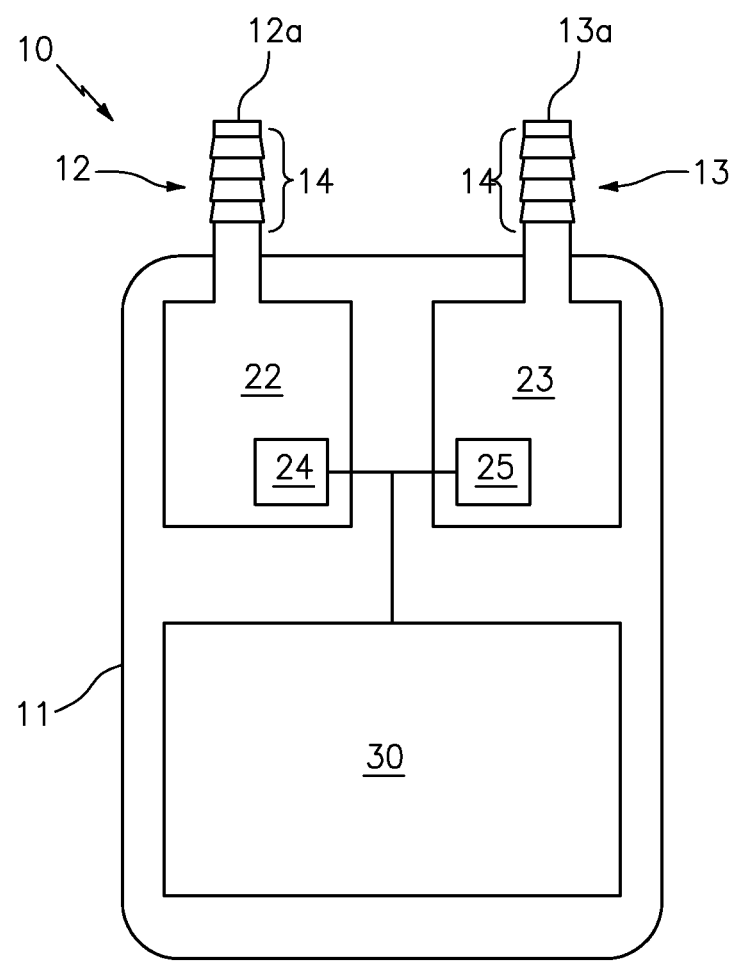
FIG. 2 is cutout view of the smartphone-operated air pressure meter of FIG. 1, in accordance with one embodiment of the invention.

As shown best in FIG. 2, wherein a portion of the main body is removed for ease of illustration, each of the input channels 12 and 13 can terminate into a pressure chamber 22 and 23, respectively, that is located within the main body 11. Pressure chambers 22 and 23 can be constructed from any number of airtight materials and can function in conjunction with the input channels to create an airtight chamber when receiving air from the secondary sensor and/or when the cap 15 is engaged.

A pair of internal pressure sensors 24 and 25, can be disposed within the pressure chambers 22 and 23, respectively. The internal pressure sensors can function to measure the pressure of the air supplied to, or located within the respective pressure chamber (i.e., airflow data) and communicate the same to the control unit 30. In the preferred embodiment, each of the pressure sensors 24 and 25 can include an electronic aerospace pressure sensor, such as the U416 pressure sensor that is commercially available by Bosch®. Of course, the invention is not limited to the use of any particular sensor, as any number of other suitable components capable of performing the above identified tasks are also contemplated.

Figure 3:
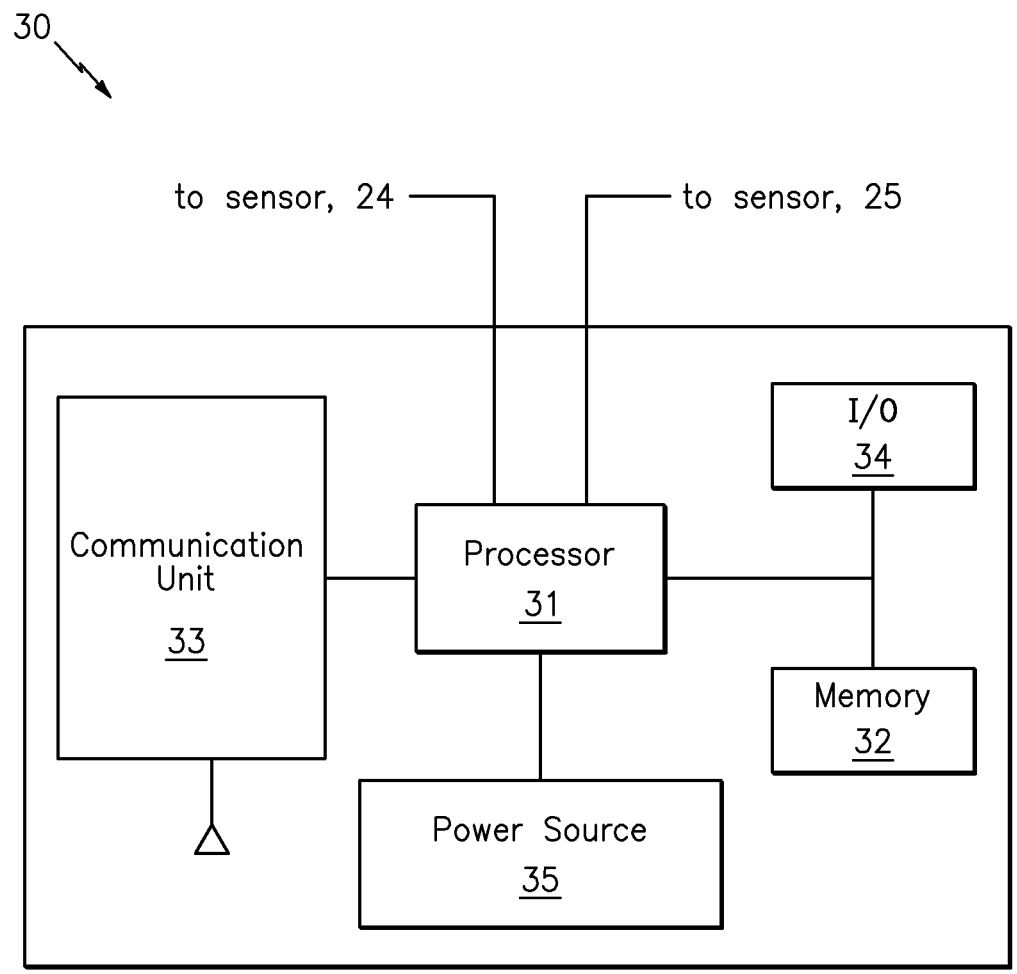
FIG. 3 is a simplistic block diagram of the controller of the smartphone-operated air pressure meter of FIG. 1, in accordance with one embodiment of the invention.

The control unit 30 can function to receive the airflow data from each of the internal pressure sensors 24 and 25, and transmit the same to a smartphone device. In this regard, FIG. 3 illustrates an exemplary block diagram of one embodiment of a suitable control unit 30. As shown, the control unit can include a processor 31 that is conventionally connected to the above described pressure sensors 24 and 25, an internal memory 32, a communication unit 33, one or more input/output units 34, and/or a power source 35.

Although illustrated as separate elements, those of skill in the art will recognize that one or more system components may be, or may include, one or more printed circuit boards (PCB) containing an integrated circuit or circuits for completing the activities described herein, and the CPU may be one or more integrated circuits having firmware for causing the circuitry to complete the activities described herein. Additionally, one or more of the above described control unit elements may also be arranged as a completely separate element (such as the power source, for example) that is communicatively linked to the processor.

The processor/CPU 31 can act to execute program code stored in the memory 32 in order to allow the device to perform the functionality described herein. Processors are extremely well known in the art, therefore no further description will be provided.

Memory 32 can act to store operating instructions in the form of program code for the processor 31 to execute. Although illustrated in FIG. 3 as a single component, memory 32 can include any number of individual local memory components. As used herein, local memory can refer to random access memory or other non-persistent memory device(s) generally used during actual execution of program code.

The communication unit 33 can include any number of devices capable of communicating with a smartphone or other external processor enabled device. In one preferred embodiment, the communication unit can include a wireless communication module that consists of a Bluetooth transceiver for communicating wirelessly with a smartphone running an App. However, any number of other known transmission and reception mechanisms and protocols can also be utilized herein, several nonlimiting examples include unique radio frequency transmitter and receivers, infrared (IR), RFID, and/or a network adapter functioning to communicate over a WAN, LAN or the internet via an internet service provider.

Although described above as performing wireless communication, other embodiments are also contemplated. In this regard, the communication unit can include, or can interface with, any number of physical communication devices capable of sending and receiving information with a smartphone. Several nonlimiting examples include a mic and stereo audio plug, USB port, micro USB port, and other known data connections.

One or more input/output units 34, can function to accept user inputs and/or provide instructions to the processor. In one embodiment, the device 10 can include one or more resilient push button(s) 34a which can individually or cumulatively initiate various programmatic functions of the device. Several nonlimiting examples of functionality which can be performed by the input/output unit includes the ability to switch the device between an ON and OFF operating state, initiate a sleep mode, and/or to pair the communication unit 33 with a smartphone or other such device.

In one preferred embodiment, the power source 35 can include one or more DC batteries capable of providing the necessary power requirements to each element of the device 10. In one embodiment, the battery or batteries can be accessible via a removable cover 35a located within the main body, in order to allow a user to easily access and replace the batteries when they are depleted. Of course, the invention is not limited to such a feature, as other embodiments are contemplated wherein one or more batteries are permanently located within the main body and can be rechargeable in nature via a charging port (not illustrated), or other such manner.

Figure 4:
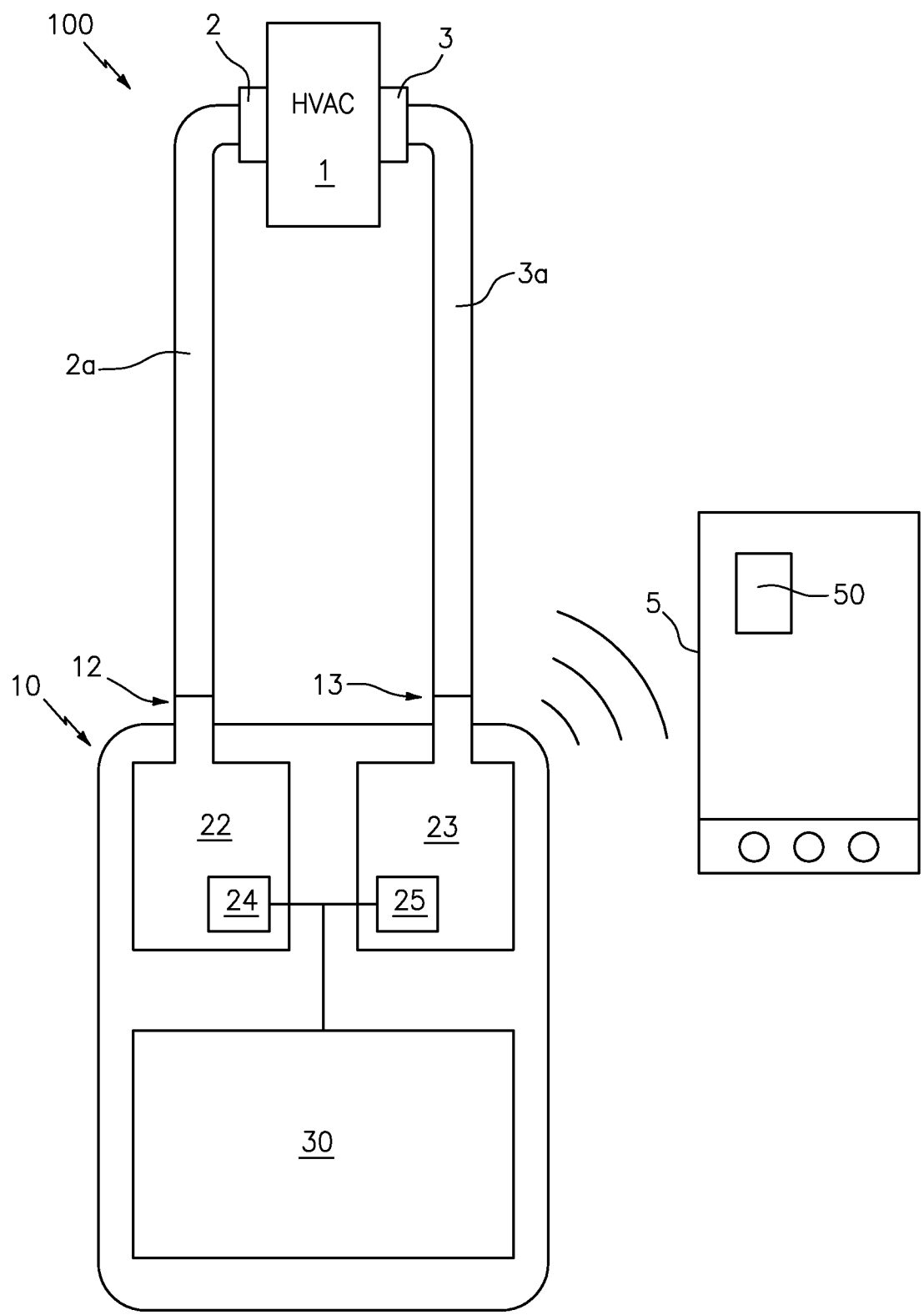
FIG. 4 illustrates one embodiment of the smartphone-operated air pressure system, in accordance with one embodiment of the invention.

FIG. 4 illustrates one embodiment of the smartphone-operated air pressure meter and system 100. As shown, device 10 can be communicatively linked to a smartphone device 5, running the airflow balancing application 50. Once connected, the input channels 12 and 13 of the device 10 can be secured to one or more pressure sensors 2 and 3 which can be located at, for example, the supply and return vents of an HVAC system 1. Air captured by these external sensor(s) can be funneled by the external supply tubes 2a and 3a through the input channels 12 and 13, and into the pressure chambers 22 and 23, which can equalize to the same pressure as the output of the sensor to which it is attached. At this time, the internal pressure sensors 24 and 25 can calculate the pressure, and provide the same as an electronic signal to the control unit 30. At this time, the device 10 can communicate the information to the smartphone 5, as described below.

Figure 5:
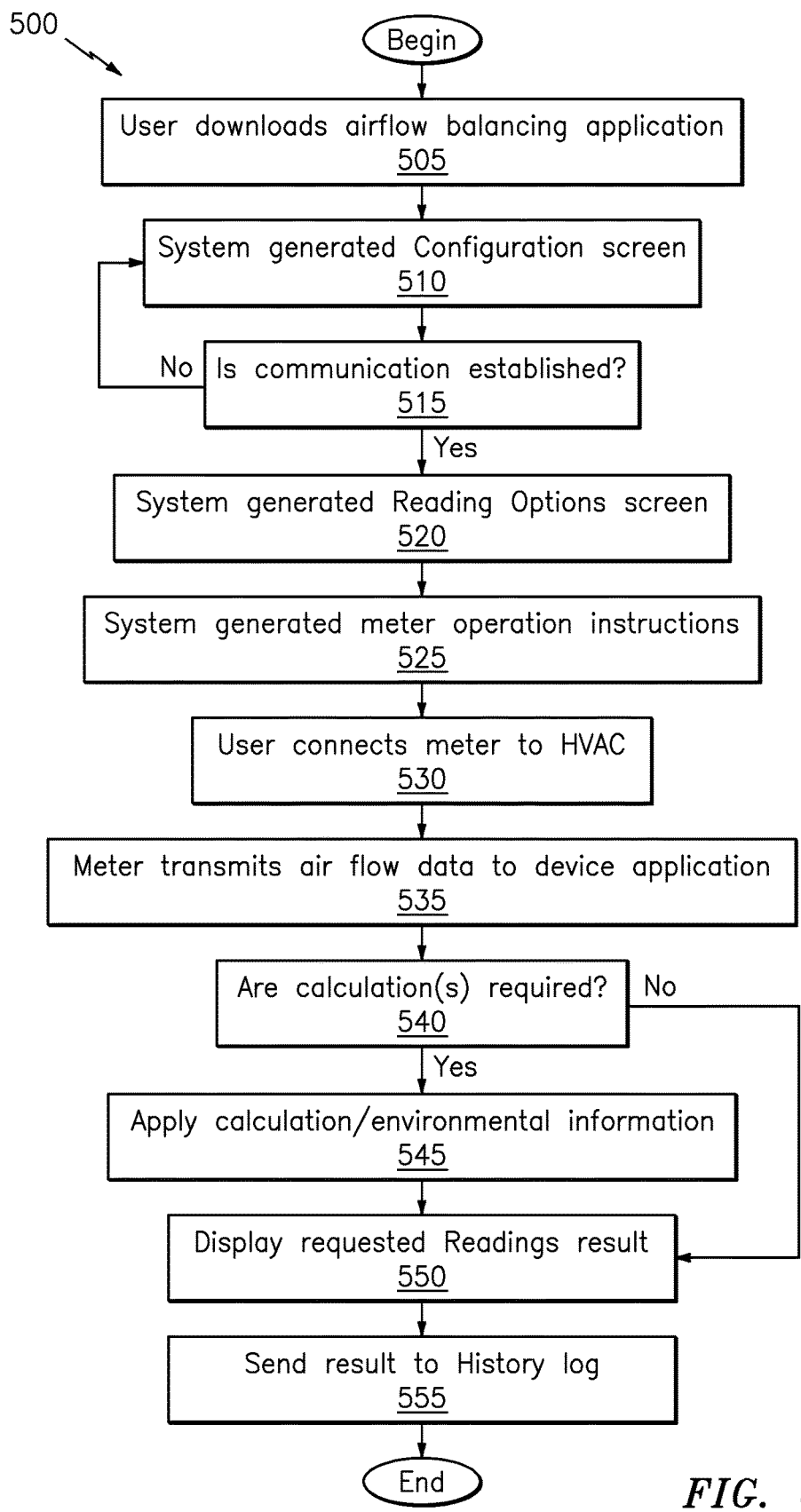
FIG. 5 is a flow chart schematic of the airflow balancing application ("App") of the smartphone-operated air pressure system, in accordance with one embodiment of the invention.

FIG. 5 illustrates an exemplary flow chart method/schematic 500 of the airflow balancing application system that is useful for understanding the inventive concepts disclosed herein. As shown, the consumer (end-user) can initially download and install the airflow balancing application 40 onto his/her Smartphone, mobile device or broadband device at step 505. After the initial install and when the app is opened/launched for the first time, the user can be taken to a Settings screen at step 510, in order to complete fields that will allow them to utilize the air pressure meter 10. In one embodiment, the settings screen can provide preliminary information to the user, such as safety information, operating instructions, local ordinances, and the like, before allowing the user to establish communication between the smartphone device 5 and the meter 10.

Figures 6A, 6B:
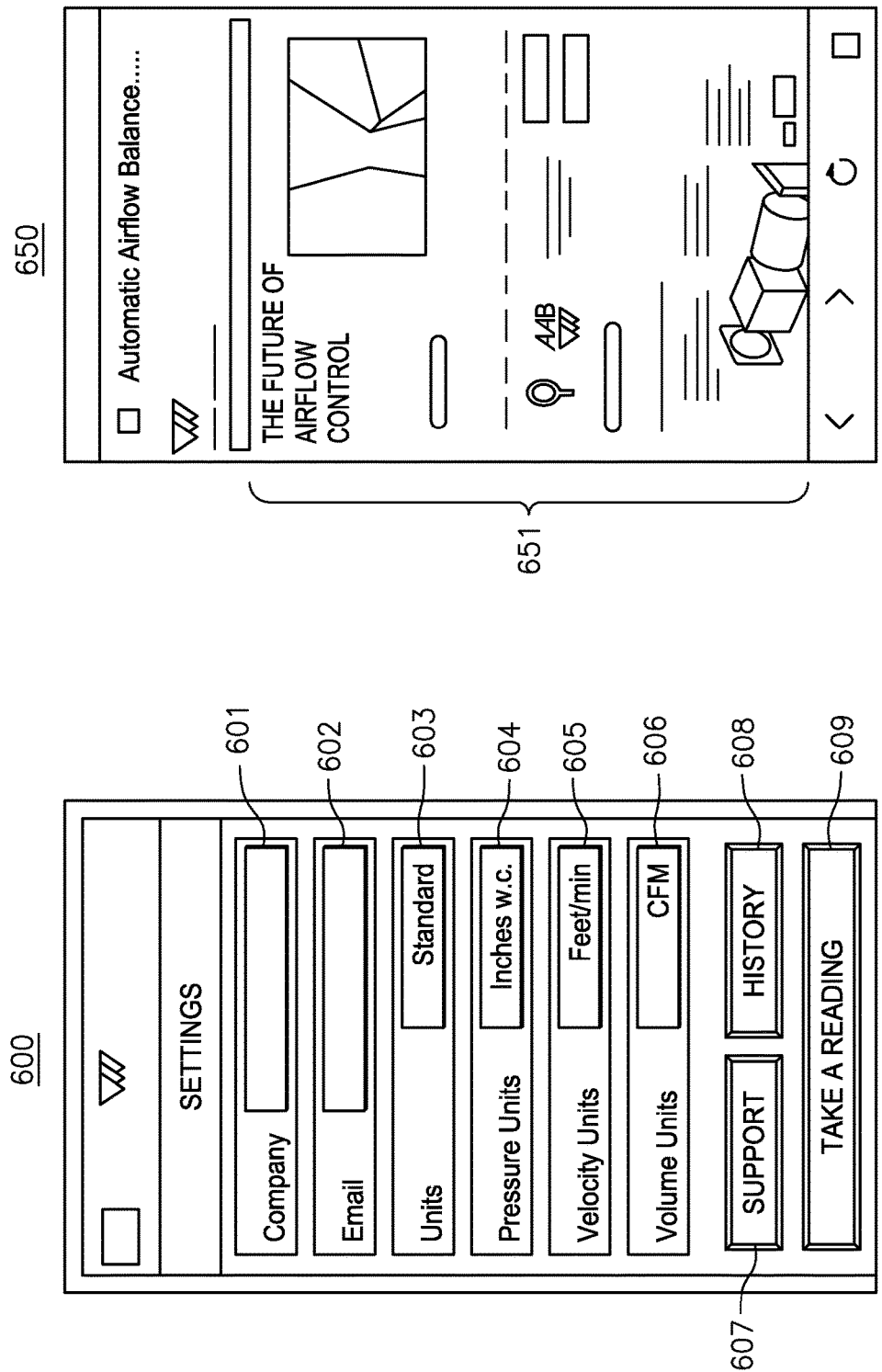

FIGS. 6A and 6B illustrate exemplary presentation screens generated by the application 40 to be displayed to a user on the smartphone device 5. As shown, a Settings screen 600 can include options for allowing the user to provide or select information such as a company name 601, contact information 602, units of measurement 603, pressure units 604, velocity units 605, volume units 606, request support 607, access a History log 608 or begin taking readings 609 utilizing the above described meter 10. Likewise, the preliminary information screen 650 can provide background information 651 about the App, the meter and/or how to use the same.

Once communication between the smartphone 5 and the meter 10 has been established at step 515, the application can present the user with a Reading Options presentation screen at step 520 for selecting the type of airflow information which the user would like to receive.

Figure 7:
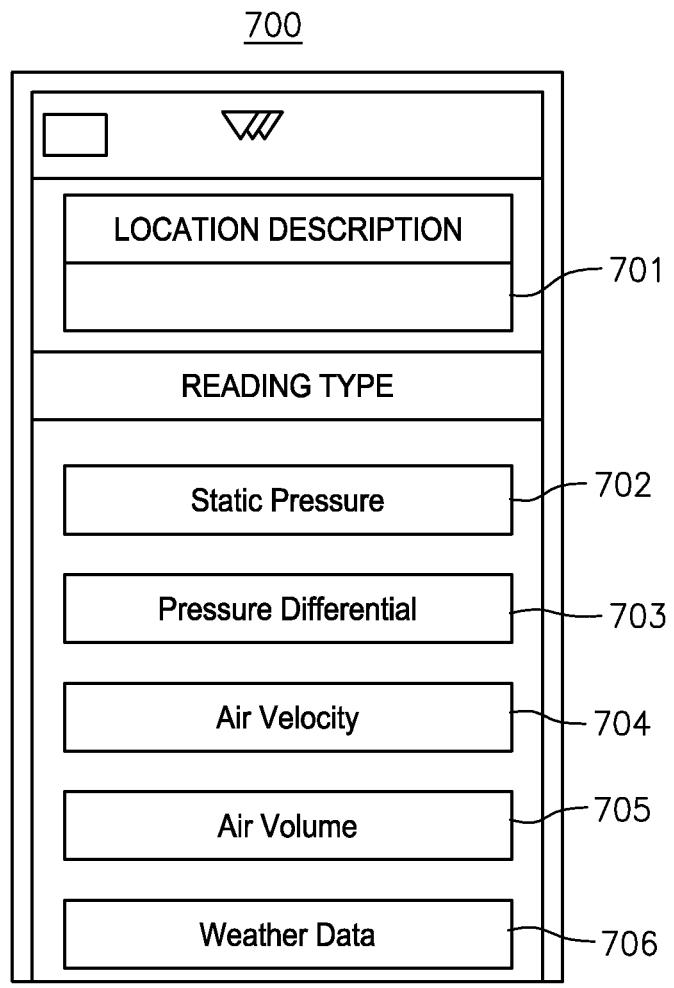

FIG. 7 illustrates an exemplary presentation screen generated by the application 40 to be displayed to a user on the smartphone device 5. As shown, a Reading Type screen 700 can be provided wherein the user can be presented with a plurality of different options for retrieving and/or calculating various types of airflow information utilizing airflow data from the meter 10. Several nonlimiting options can include a location description 701, static pressure information 702, pressure differential information 703, air velocity 704, air volume 705 and/or environmental conditions 706, which can be retrieved utilizing the smartphones' GPS and/or a weather provider platform, as described above.

Once the user has made a selection at step 520, the system can proceed to step 525, wherein various presentation screens can be presented for instructing the user on how to connect the meter 10 to the HVAC system 1. In this regard, FIG. 8A illustrates an exemplary presentation screen generated by the application 40 to be displayed to a user on the smartphone device 5. As shown, a Meter operation screen 800 can be provided, wherein instructions 810 for connecting the meter 10 to the HVAC system 1 are provided in order to obtain a static pressure reading.

Figure 9C:
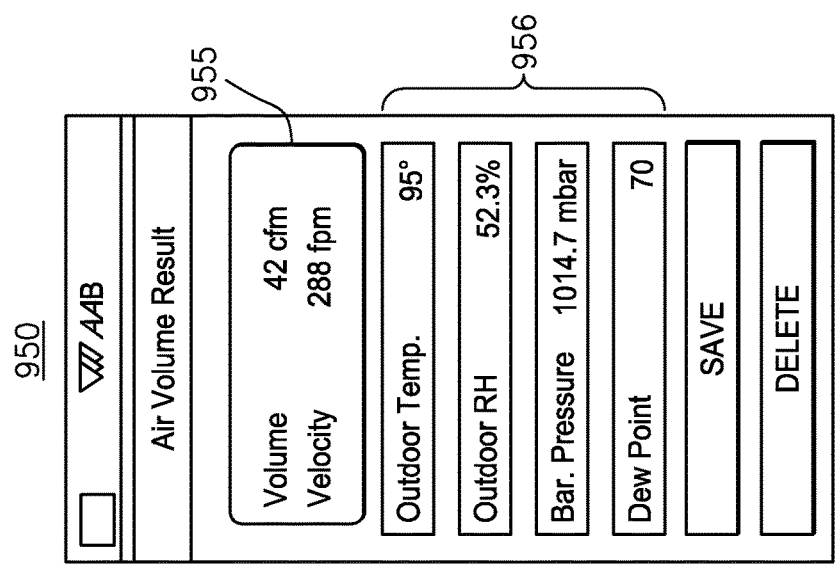
Figure 9B:
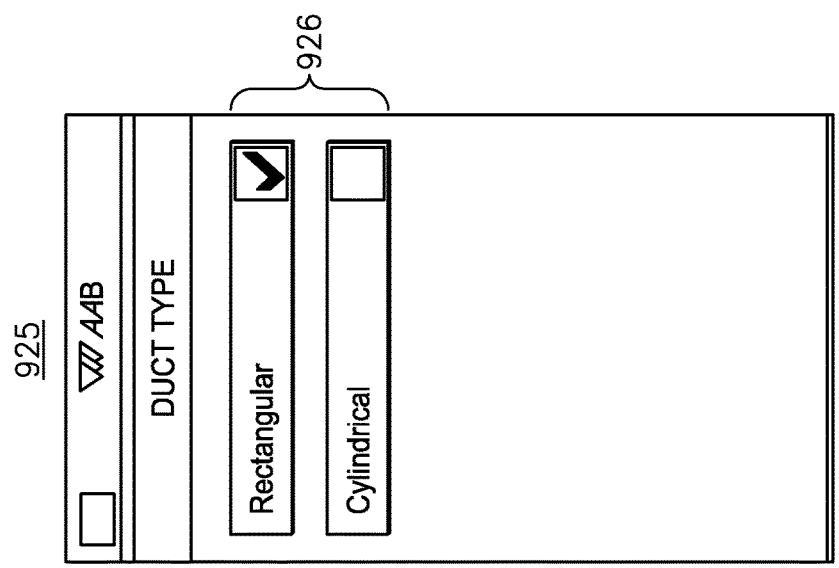
Figure 9A:
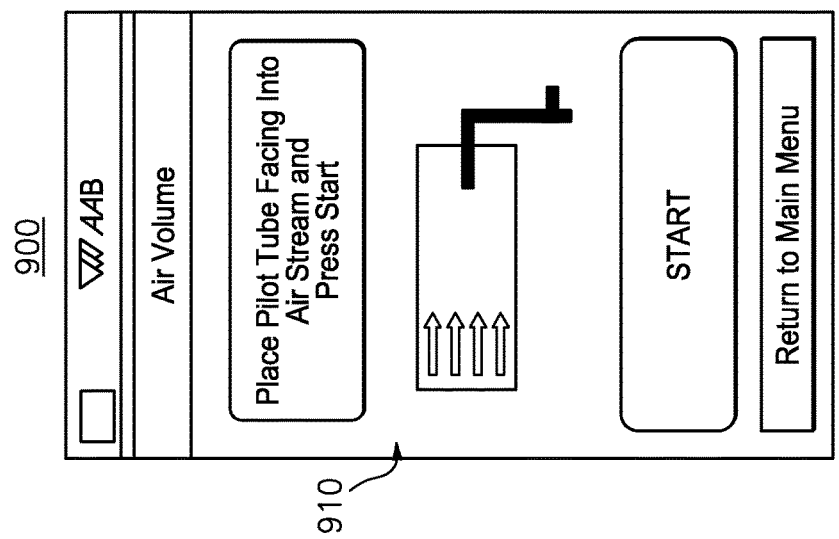

FIGS. 9A and 9B illustrate other exemplary presentation screens generated by the application 40 to be displayed to a user on the smartphone device 5. As shown, another meter operation screen 900 can be provided having meter connection instructions 910, in order to determine the Air volume of the HVAC system 1. In the present example, an additional information screen 925 can be provided wherein additional information 926 can be requested from the user, in order calculate the air volume of the HVAC system 1.

At step 530, the user can make the requisite meter connections, and at step 535, the airflow balancing application 40 can receive the airflow data from the meter 10.

Next, the system can determine 540 if calculations are necessary to render the airflow information selected by the user in step 520. If calculations are needed, the system can apply one or more algorithms and/or mathematical steps to the data received at step 535, in order to calculate 545 the requested information. In this regard, the App loaded onto the smartphone can include and store within the smartphone memory any number of different mathematical equations, algorithms and/or process steps that are necessary to determine the requested airflow information. As such, the smartphone processor can be utilized to apply one or more stored equations to the airflow data from the meter, and can display the same to the end user. Moreover, in instances where environmental conditions must be factored, the smartphone processor can apply environmental data, as described above, to the equation to generate the requested airflow information.

In another embodiment, the App can include instructions for instructing the smartphone processor to access secondary information sources such as an online database, for example, wherein all or additional equations can be accessed and/or downloaded into the smartphone memory to be used as described above.

In either instance, once the system has calculated the airflow information requested in step 520, (or if no calculations are necessary), the same can be displayed to the user as a Result screen 550, and can also be stored on the smartphone in the form of a History log 555. By providing a History log, the system can allow the user to either store, or transmit the airflow information to any number of other devices through known communication mechanisms such as an email, text and the like, utilizing the smartphone components.

FIGS. 8B and 9C illustrate various exemplary Result screens which can be generated by the system as described above with respect to step 550. For example, Result screen 850 can include the results 855 of the static pressure request of FIG. 8A, wherein no calculations were necessary, and the information displayed is simply the data received from the meter 10.

Conversely, Result screen 950 can include the results of the air volume request of FIGS. 9A and 9B. As shown, the result screen 950 can include the calculated air volume and velocity 955, as well as various pieces of environmental information 956, such as the dew point and temperature, for example, that may have been factored into the calculation performed by the system at step 545.

Figure 10:
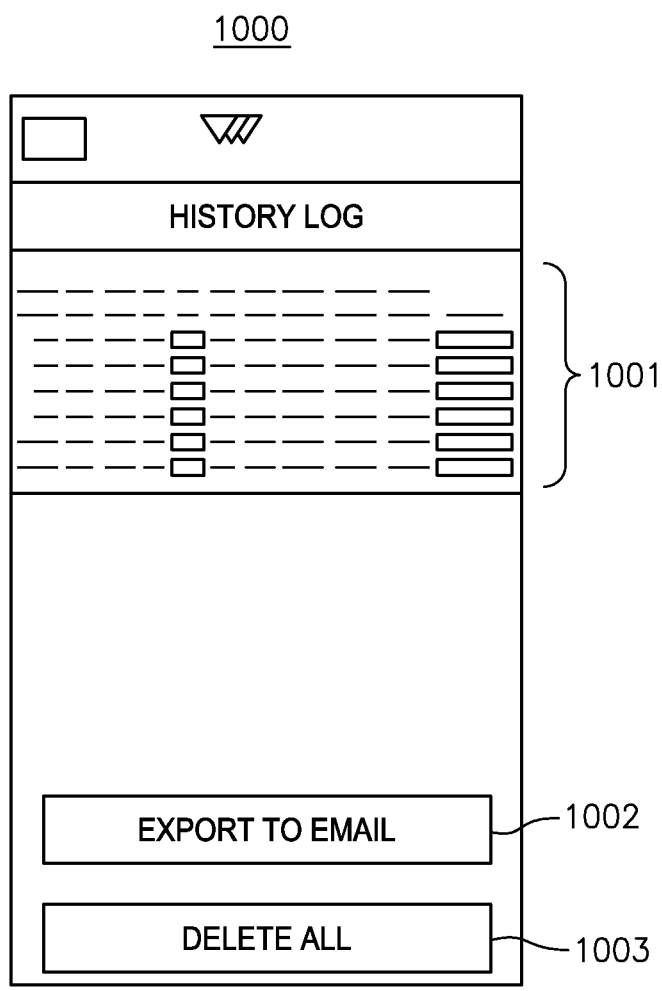

Finally, FIG. 10 illustrates an exemplary History log screen 1000. As shown, previous measurements and results 1001 can be displayed, and options for exporting 1002 and/or deleting 1003 the data can also be provided.

Although described and illustrated as displaying and calculating certain types of airflow information from the HVAC system of a building, those of skill in the art will recognize that the system 100 can be configured to display and calculate an unlimited amount of information from virtually any known air source, without undue experimentation, and without deviating from the scope and spirit of the inventive concepts disclosed herein.

Accordingly, the above described system provides users with a low cost alternative to stand alone air pressure measurement devices, and utilizes the processing power and communicative ability of the users own smartphone device to retrieve environmental information and factor the same into airflow information in a novel fashion.

As described herein, one or more elements of the smartphone-operated air pressure meter 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's smartphone, partly on the user's smartphone, as a stand-alone software package, partly on the user's smartphone and partly on a remote computer or entirely on the remote computer or server. In the latter scenario, the remote computer may be connected to the user's smartphone through any type of network, including a cellular network connection, a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An air pressure meter and system, comprising:
an airflow balancing application that includes machine readable instructions for execution on an external processor enabled device having a memory, internet connectivity, and display screen, said application functioning to
generate an airflow balancing icon on the display screen, and
calculate and display airflow information on the display screen; and
an air pressure meter that includes
a main body having an external surface that defines an internal cavity,
first and second pressure chambers that are disposed within the internal cavity of the main body,
first and second input channels that are in communication with the first and second pressure chambers, respectively, along a first end,
said first and second input channels further including a second end that extends outward from the main body,
first and second pressure sensors that are disposed within the first and second pressure chambers, respectively, and
a control unit that functions to communicate with the first and second pressure sensors, and to transmit airflow data to the airflow balancing application.

2. The system of claim 1, wherein the first and second input channels include elongated tubular members having a connector disposed along the second end that functions to engage an external air supply tube.

3. The system of claim 2, further comprising:
first and second channel covers that function to engage the second end of the first and second input channels, respectively.

4. The system of claim 3, wherein each of the first and second pressure chambers are constructed from an airtight material, and are airtight when the first and second channel covers are engaged.

5. The system of claim 1, wherein the first and second pressure sensors include an electronic aerospace pressure sensor that functions to generate the airflow data.

6. The system of claim 5, wherein the airflow data includes a pressure of air that is supplied to at least one of the first and second pressure chambers, respectively.

7. The system of claim 1, wherein the airflow balancing application further includes functionality for storing one or more algorithms within the memory of the processor enabled device.

8. The system of claim 7, wherein the airflow balancing application further includes functionality for applying the one or more algorithm to the airflow data, in order to generate the airflow information.

9. The system of claim 8, wherein the airflow information includes at least one of a total pressure, a static pressure, a pressure velocity, an absolute pressure, an atmospheric pressure, an air volume, and a gas volume.

10. The system of claim 7, wherein the airflow balancing application further includes functionality for receiving environmental data based on a location of the processor enabled device.

11. The system of claim 10, wherein the environmental data includes at least one of atmospheric pressure, humidity level and barometric pressures.

12. The system of claim 11, wherein the airflow balancing application further includes functionality for applying the one or more algorithm to the airflow data and the environmental data, in order to generate the airflow information.

13. The system of claim 12, wherein the airflow information includes at least one of a total pressure, a static pressure, a pressure velocity, an absolute pressure, an atmospheric pressure, a temperature, a humidity level, a dew point, an air volume, and a gas volume.

14. The system of claim 1, wherein the airflow balancing application further includes functionality for instructing a user to connect the airflow meter to an HVAC system, based on a type of airflow information to be generated.

15. The system of claim 1, wherein the airflow balancing application further includes functionality for creating and transmitting a history log screen displaying a previously obtained air pressure information.

16. The system of claim 1, wherein the control unit comprises:
   a memory;
   an input/output unit;
   a wireless communication module that functions to communicate wirelessly with the airflow balancing application;
   a power source; and
   a processor that is in communication with, and controls an operation of each of the power source, the wireless communication module, the input/output unit, the memory and the first and second pressure sensors.

17. The system of claim 16, wherein the wireless communication module includes, at least one of a unique radio frequency transmitter and receiver, an infrared transmitter and receiver, and a wireless network adapter.

18. The system of claim 16, wherein the wireless communication module consists of a Bluetooth transceiver.

19. The system of claim 16, wherein the power source includes one or more DC batteries that function to supply a power requirement to each of the processor, the wireless communication module, the memory, and the first and second pressure sensors.

20. The system of claim 16, wherein the input/output unit includes one or more resilient push buttons that function to receive user inputs and communicate the same to the processor.

* * * * *